(12) United States Patent
Murray

(10) Patent No.: US 7,018,567 B2
(45) Date of Patent: Mar. 28, 2006

(54) ANTISTATIC FLAME RETARDANT RESIN COMPOSITION AND METHODS FOR MANUFACTURE THEREOF

(75) Inventor: Michael C. Murray, Glenmont, NY (US)

(73) Assignee: General Electric Company, Pittsfield, MA (US)

( * ) Notice: Subject to any disclaimer, the term of this patent is extended or adjusted under 35 U.S.C. 154(b) by 208 days.

(21) Appl. No.: 10/064,495

(22) Filed: Jul. 22, 2002

(65) Prior Publication Data

US 2004/0011999 A1 Jan. 22, 2004

(51) Int. Cl.
H01B 1/20 (2006.01)
C08L 83/04 (2006.01)
C08K 53/00 (2006.01)

(52) U.S. Cl. .................. 252/511; 252/510; 524/588; 524/117

(58) Field of Classification Search ............. 252/511, 252/510; 524/588, 117, 511; 525/67
See application file for complete search history.

(56) References Cited

U.S. PATENT DOCUMENTS

| | | | |
|---|---|---|---|
| 4,038,258 A | 7/1977 | Singh et al. ............. 260/75 T |
| 4,115,475 A | 9/1978 | Foy et al. ............. 260/857 PE |
| 4,195,015 A | 3/1980 | Deleens et al. ......... 260/45.75 C |
| 4,217,438 A | 8/1980 | Brunelle et al. ........... 528/260 |
| 4,230,838 A | 10/1980 | Foy et al. .................. 525/408 |
| 4,254,775 A | 3/1981 | Langer .................. 128/419 D |
| 4,331,786 A | 5/1982 | Foy et al. .................. 525/408 |
| 4,332,920 A | 6/1982 | Foy et al. .................. 525/408 |
| 4,537,596 A | 8/1985 | Muller et al. ................. 8/115.6 |
| 4,839,441 A | 6/1989 | Cuzin et al. ................ 528/328 |
| 4,864,014 A | 9/1989 | Cuzin et al. ................ 528/279 |
| 5,112,940 A | 5/1992 | Korte ........................ 528/301 |
| 5,159,053 A | 10/1992 | Kolycheck et al. .......... 528/76 |
| 5,360,861 A * | 11/1994 | Campbell .................. 524/494 |
| 5,604,284 A | 2/1997 | Ueda et al. ................. 524/434 |
| 5,652,326 A | 7/1997 | Ueda et al. ................. 528/288 |
| 5,658,984 A | 8/1997 | Ishii et al. .................... 525/66 |
| 5,840,807 A | 11/1998 | Frey et al. .................. 525/178 |
| 5,863,466 A | 1/1999 | Mor ........................... 252/500 |
| 5,886,098 A | 3/1999 | Ueda et al. ................... 525/66 |
| 6,083,428 A * | 7/2000 | Ueda et al. ................. 252/609 |
| 6,117,969 A | 9/2000 | Nanba et al. ............... 528/198 |
| 6,211,939 B1 * | 4/2001 | Campbell et al. ........... 524/117 |
| 6,221,939 B1 | 4/2001 | Campbell et al. | |
| 6,308,142 B1 | 10/2001 | Choate et al. ............. 702/179 |
| 2002/0077417 A1 * | 6/2002 | Itagaki ....................... 525/67 |

FOREIGN PATENT DOCUMENTS

| | | | |
|---|---|---|---|
| EP | 0613919 | | 9/1994 |
| GB | 2043083 A | | 3/1979 |
| GB | 2 043 083 | * | 6/1979 |
| JP | 01163252 | | 6/1989 |
| JP | 06329790 | | 11/1994 |
| JP | 06345927 | | 12/1994 |
| JP | 07330899 | | 12/1995 |
| JP | 08048768 | | 2/1996 |
| JP | 09310000 | | 12/1997 |
| JP | 11-181267 | * | 7/1999 |
| JP | 11-199767 | * | 7/1999 |
| JP | 11199767 | | 7/1999 |

OTHER PUBLICATIONS

International Search Report dated Sep. 10, 2003.
Talley, J.J.; "Preparation of Sterically Hindered Phosphoramidates"; *J. Chem. Eng. Data 1988, 33*, 221-222.
Japanese Abstract for JP 58-013642 A Publication Date Jan. 26, 1983.
Japanese Abstract for JP 62-011759 A Publication Date Jan. 20, 1987.
Japanese Abstract for JP 02-263863 A Publication Date Oct. 26, 1990.
Japanese Abstract for JP 07-145368 A Publication Date Jun. 6, 1995.
Japanese Abstract for JP 09-309999 A Publication Date Dec. 2, 1997.
Japanese Abstract for JP 08-059948 A Publication Date Mar. 5, 1996.
Japanese Abstract for JP 09-279010 A Publication Date Oct. 28, 1997.
Japanese Abstract for JP 09-279009 A Publication Date Oct. 28, 1997.

* cited by examiner

*Primary Examiner*—Mark Kopec
*Assistant Examiner*—Kallambella Vijayakumar

(57) ABSTRACT

An antistatic flame retardant composition comprises a polycarbonate resin; an impact modifier comprising polysiloxane; an antistatic agent; and a flame retardant in a an amount greater than or equal to about 9 wt % of the total composition. Owing to its excellent antistatic, impact and flame retardant properties, the composition can be used in electrical and electronic equipment and precision machinery where high fabrication temperatures and high usage temperatures are often encountered.

19 Claims, No Drawings

ANTISTATIC FLAME RETARDANT RESIN COMPOSITION AND METHODS FOR MANUFACTURE THEREOF

BACKGROUND OF INVENTION

This disclosure relates generally to antistatic compositions, their use in flame retardant resin compositions, and a method of manufacture thereof.

Polymeric resins are suitable for a large number of applications because of their high strength-to-weight ratio and ease of processing. However, the build up of electrostatic charges in the polymeric resin attracts dust and foreign particles, thereby spoiling the appearance of molded parts made therefrom. Moreover, the build up of electrostatic charges renders the polymeric resin unusable in certain electrical and electronic applications. It is therefore desirable to have polymeric resins that possess antistatic properties (i.e., are electrostatically conductive) and that maintain these properties at the elevated temperatures used in processing these materials.

Polymeric resins and articles having antistatic properties are typically obtained by directly blending antistatic agents with the polymeric resins during a compounding process. Unfortunately, the antistatic agent often migrates to the surface layer of the article over time, lowering the antistatic properties due to frictional wear of the surface layer. A need therefore remains for stable antistatic compositions wherein the antistatic agent remains well dispersed in the bulk of the polymeric resin during high temperature processing and subsequent use. In addition, it is desirable to have flame retardant antistatic compositions for end use applications such as electronic applications or packaging flammable materials.

SUMMARY OF INVENTION

An antistatic, impact resistant, flame retardant composition comprises a polycarbonate resin; an impact modifier comprising polysiloxane; an antistatic agent; and a flame retardant in an amount greater than or equal to about 9 wt %. Owing to its excellent antistatic, impact and flame retardant properties, the composition can be used in electrical and electronic equipment, and precision machinery where high fabrication temperatures and high usage temperatures are often encountered.

DETAILED DESCRIPTION

Antistatic compositions comprising polymeric resins and antistatic agents are often flammable, which is undesirable especially in electronic applications. The addition of large amounts of a flame retardant to reduce the flammability of the material typically has the effect of reducing the impact properties of the material. It has now been unexpectedly discovered that the addition of bisphenol A bis(diphenyl phosphate) (hereinafter BPADP) to an antistatic composition comprising a polymeric resin, an impact modifier comprising polysiloxane, and an antistatic agent such as PELESTAT 6321, commercially available from Sanyo, or PEBAX MH1657, commercially available from Atofina, can impart excellent flame retardant properties to the composition while maintaining impact properties. This combination of antistatic, impact resistance, and flame retardant properties is useful in electronic articles as well as for packaging flammables. These compositions can also be used as media optical shells for optical media and other similar data storage devices.

The term polycarbonate resin, comprises aromatic carbonate chain units and includes compositions having structural units of the formula (I):

in which at least about 60 percent of the total number of $R^1$ groups are aromatic organic radicals and the balance thereof are aliphatic, alicyclic, or aromatic radicals.

Preferably, $R^1$ is an aromatic organic radical and, more preferably, a radical of the formula (II):

wherein each of $A^1$ and $A^2$ is a monocyclic, divalent aryl radical and $Y^1$ is a bridging radical having one or two atoms which separate $A^1$ from $A^2$. In an exemplary embodiment, one atom separates $A^1$ from $A^2$. Illustrative non-limiting examples of radicals of this type are —O—, —S—, —S(O)—, —S(O$_2$)—, —C(O)—, methylene, cyclohexyl-methylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ can be a hydrocarbon group or a saturated hydrocarbon group such as methylene, cyclohexylidene or isopropylidene.

Polycarbonate resins can be produced by the reaction of the carbonate precursor with dihydroxy compounds. Typically, an aqueous base such as (e.g., sodium hydroxide, potassium hydroxide, calcium hydroxide, and the like,) is mixed with an organic, water immiscible solvent such as benzene, toluene, carbon disulfide, or dichloromethane, which contains the dihydroxy compound. A phase transfer resin is generally used to facilitate the reaction. Molecular weight regulators may be added to the reactant mixture. These molecular weight regulators may be added singly or as a combination. Branching resins, described forthwith may also be added singly or in admixture. Another process for producing aromatic polycarbonate resins is the transesterification process, which involves the transesterification of an aromatic dihydroxy compound and a diester carbonate. This process is known as the melt polymerization process. The process of producing the aromatic polycarbonate resins is not critical.

As used herein, the term "dihydroxy compound" includes, for example, bisphenol compounds having general formula (III) as follows:

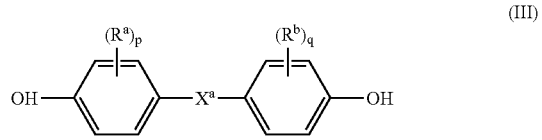

wherein $R^a$ and $R^b$ beach represent a halogen atom, for example chlorine or bromine, or a monovalent hydrocarbon group, preferably having from 1 to 10 carbon atoms, and may be the same or different; p and q are each independently integers from 0 to 4; Preferably, $X^a$ represents one of the groups of formula (IV):

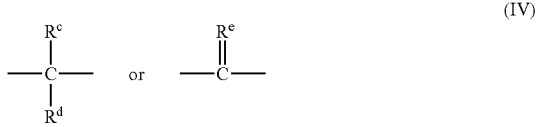

(IV)

wherein $R^c$ and $R_d$ each independently represent a hydrogen atom or a monovalent linear or cyclic hydrocarbon group and $R^e$ is a divalent hydrocarbon group.

Some illustrative, non-limiting examples of suitable dihydroxy compounds include the dihydroxy-substituted aromatic hydrocarbons disclosed by name or formula (generic or specific) in U.S. Pat. No. 4,217,438, which is incorporated herein by reference. A nonexclusive list of specific examples of the types of bisphenol compounds that may be represented by formula (III) includes 1,1-bis(4-hydroxyphenyl) methane; 1,1-bis(4-hydroxyphenyl) ethane; 2,2-bis(4-hydroxyphenyl) propane (hereinafter "bisphenol A" or "BPA"); 2,2-bis(4-hydroxyphenyl) butane; 2,2-bis(4-hydroxyphenyl) octane; 1,1-bis(4-hydroxyphenyl) propane; 1,1-bis(4-hydroxyphenyl) n-butane; bis(4-hydroxyphenyl) phenylmethane; 2,2-bis(4-hydroxy-1-methylphenyl) propane; 1,1-bis(4-hydroxy-t-butylphenyl) propane; bis (hydroxyaryl) alkanes such as 2,2-bis(4-hydroxy-3-bromophenyl) propane; 1,1-bis (4-hydroxyphenyl) cyclopentane; and bis(hydroxyaryl) cycloalkanes such as 1,1-bis(4-hydroxyphenyl) cyclohexane. Two or more different dihydric phenols may also be used.

Typical carbonate precursors include the carbonyl halides, for example carbonyl chloride (phosgene), and carbonyl bromide; the bis-haloformates, for example the bis-haloformates of dihydric phenols such as bisphenol A, hydroquinone, and the like, and the bis-haloformates of glycols such as ethylene glycol and neopentyl glycol; and the diaryl carbonates, such as diphenyl carbonate, di(tolyl) carbonate, and di(naphthyl) carbonate.

Typical branching resins such as α,α,α',α'-tetrakis(3-methyl-4-hydroxyphenyl)-p-xylene, α,α,α',α'-tetrakis(2-methyl-4-hydroxyphenyl)-p-xylene, α,α,α',α'-tetrakis(2,5 dimethyl-4-hydroxyphenyl)-p-xylene, α,α,α',α'-tetrakis(2,6 dimethyl-4-hydroxyphenyl)-p-xylene, α,α,α',α'-tetrakis(4-hydroxyphenyl)-p-xylene, trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4-(4-(1,1-bis(p-hydroxyphenyl)-ethyl)alpha,alpha-dimethylbenzyl)phenol), 4-chloroformyl phthalic anhydride, trimesic acid, benzophenone tetracarboxylic acid and the like, can also be added to the reaction mixture. Blends of linear polycarbonate and branched polycarbonate resins can be utilized herein. The branching agent may be added at a level of about 0.05 to about 2.0 weight percent (wt %).

Some illustrative, non-limiting examples of suitable phase transfer resins include, but are not limited to, tertiary amines such as triethylamine, quaternary ammonium compounds, and quaternary phosphonium compounds.

Molecular weight regulators or chain stoppers are optional and are added to the mixture in order to arrest the progress of the polymerization. Typical molecular weight regulators such as phenol, chroman-1, p-t-butylphenol, p-bromophenol, para-cumyl-phenol, and the like may be added either singly or in admixture and are typically added in an amount of about 1 to about 10 mol % excess with respect to the BPA. The molecular weight of the polycarbonate resin is generally greater than or equal to about 5000, preferably greater than or equal to about 10,000, more preferably greater than or equal to about 15,000 g/mole. In general it is desirable to have the polycarbonate resin less than or equal to about 100,000, preferably less than or equal to about 50,000, more preferably less than or equal to about 30,000 g/mole as calculated from the viscosity of a methylene chloride solution at 25° C.

Polycarbonate resins are generally used in amounts greater than or equal to about 10 weight percent (wt %), preferably greater or equal to about 30 wt %, more preferably greater than or equal to about 40 wt % of the total composition. The polymeric resins are furthermore generally used in amounts less than or equal to about 99 weight percent wt %, preferably less than or equal to about 85 wt %, more preferably less than or equal to about 75 wt % of the total composition.

The term "antistatic agent" refers to several materials that can be either melt-processed into polymeric resins or sprayed onto commercially available polymeric forms and shapes to improve conductive properties and overall physical performance.

Examples of monomeric antistatic agents that may be used are glycerol monostearate, glycerol distearate, glycerol tristearate, ethoxylated amines, primary, secondary and tertiary amines, ethoxylated alcohols, alkyl sulfates, alkylarylsulfates, alkylphosphates, alkylaminesulfates, quaternary ammonium salts, quaternary ammonium resins, imidazoline derivatives, sorbitan esters, ethanolamides, betaines and mixtures of the foregoing. Non-limiting examples of commercial monomeric antistatic agents which may be used in polymeric resins are Pationic 1042 and PATIONIC AS10, available from Patco, or STATEXAN® K1, available from Bayer.

Examples of polymeric antistatic agents include: copolyesteramides such as those disclosed in U.S. Pat. Nos. 4,115,475 to Foy et al., U.S. Pat. Nos. 4,839,441 and 4,864,014 to Cuzin et al.; polyether-polyamide (polyetheramide) block copolymers such as those disclosed in U.S. Pat. No. 5,840,807 to Frey et al.; polyetheresteramide block copolymers such as those disclosed in U.S. Pat. Nos. 5,604,284; 5,652,326; and 5,886,098 to Ueda et al., U.S. Pat. Nos. 4,331,786; 4,230,838; 4,332,920 to Foy et al., and U.S. Pat. Nos. 4,195,015 to Deleens et al.; polyurethanes containing a polyalkylene glycol moiety such as those disclosed in U.S. Pat. No. 5,159,053 to Kolycheck et al., and U.S. Pat. No. 5,863,466 to Mor et al.; polyetheresters such as those disclosed in U.S. Pat. No. 5,112,940, U.S. Pat No 4,537,596 to Muller et al., and U.S. Pat. No. 4,038,258 to Singh et al, all of which are incorporated herein by reference. Polymeric antistatic agents have been shown to be fairly thermally stable and processable in the melt state in their neat form or in blends with other polymeric resins. Examples of polyetheramides, polyetheresters and polyetheresteramides include block copolymers and graft copolymers both obtained by the reaction between a polyamide-forming compound and/or a polyester-forming compound, and a compound containing a polyalkylene oxide unit. Polyamide forming compounds include aminocarboxylic acids such as ω-aminocaproic acid, ω-aminoenanthic acid, ω-aminocaprylic acid, ω-aminopelargonic acid, ω-aminocapric acid, 11-aminoundecanoic acid and 12-aminododecanoic acid; lactams such as ε-caprolactam and enanthlactam; a salt of a diamine with a dicarboxylic acid, such as hexamethylene diamine adipate, hexamethylene diamine sebacate, and hexamethylene diamine isophthalate; and a mixture of these polyamide-forming compounds. It is preferred that the polyamide-forming compound is a caprolactam, 12-aminododecanoic acid, or a combination of hexamethylene diamine and adipate.

Polyester forming compounds include a combination of a dicarboxylic acid (or a mixture of two or more dicarboxylic acids) with an aliphatic diol (or a mixture of two or more aliphatic diols). Non-limiting examples of dicarboxylic acids include aromatic dicarboxylic acids, such as isophthalic acid, terephthalic acid, phthalic acid, naphthalene-2,6-dicarboxylic acid, naphthalene-2,7-dicarboxylic acid, diphenyl-4,4'-dicarboxylic acid, diphenoxyethanedicarboxylic acid and sodium 3-sulfoisophthalate; alicyclic dicarboxylic acids, such as 1,3-cyclopentanedicarboxylic acid, 1,4 cyclohexanedicarboxylic acid, 1,2-cyclohexanedicarboxylic acid and 1,3-dicarboxymethylcyclohexane; and aliphatic dicarboxylic acids, such as succinic acid, oxalic acid, adipic acid, sebacic acid and decanedicarboxylic acid. These dicarboxylic acids may be used individually or in combination. Non-limiting examples of aliphatic diols include ethylene glycol, 1,2-propylene glycol, 1,3-propylene glycol, 1,2-butanediol, 1,3-butanediol, 2,3-butanediol, 1,4-butanediol, neopentyl glycol and hexanediol. These aliphatic diols may be used individually or in combination. Preferred dicarboxylic acids are terephthalic acid, isophthalic acid, 1,4-cyclohexanedicarboxylic acid, and sebacic acid and decanedicarboxylic acid. Preferred diols are ethylene glycol, 1,2-propylene glycol, 1,3-propylene glycol and 1,4-butanediol.

Compounds containing polyalkylene oxide units such as polyethylene glycol, polypropylene glycol, polytetramethylene glycol and a block or random copolymer of ethylene oxide and tetramethylene oxide; diamines obtained by replacing the terminal hydroxyl groups of these diols by amino groups; and dicarboxylic acids obtained by replacing the terminal hydroxyl groups of these diols by carboxylic acid groups can be used to form the polyetheramide, polyetherester and polyetheresteramide polymeric antistatic agents. These compounds containing a polyalkylene oxide unit can be used individually or in combination. Of these compounds, polyethylene glycol is preferred.

For synthesizing a polyetheramide, a polyetherester or a polyetheresteramide, there can be employed a method in which a polyamide-forming compound and/or a polyester-forming compound is reacted with a polyalkylene oxide unit-containing compound, wherein, depending on the type of the terminal groups of the polyalkylene oxide unit-containing compound, the reaction is an esterification reaction or an amidation reaction. Further, depending on the type of the reaction, a dicarboxylic acid or a diamine may also be used in the reaction.

Polymeric antistatic agents such as PELESTAT 6321, available from Sanyo, or PEBAX MH1657, available from Atofina, are non-limiting examples of commercially available polymeric antistatic agents that may be added to polymeric resins to improve conductive properties. Other commercially available antistatic agents are IRGASTAT P18 and P22 from Ciba-Geigy. Other polymeric materials that may be used as antistatic agents are doped inherently conducting polymers such as polyaniline (commercially available as PANIPOL® EB from Panipol), polypyrrole and polythiophene (commercially available from Bayer), which retain some of their intrinsic conductivity after melt processing at elevated temperatures.

In one embodiment, the antistatic agent is generally used in an amount greater than or equal to about 0.01, preferably greater or equal to about 0.1, and more preferably greater than or equal to about 1 wt % of the total composition. The antistatic agent is generally used in amount less than or equal to about 25 wt %, preferably less than or equal to about 15 wt %, and more preferably less than or equal to about 10 wt % of the total composition.

Impact modifiers used in the antistatic compositions may be copolymers comprising a polysiloxane, such as, for example, A-B-A triblock copolymers and A-B diblock copolymers. In one embodiment the impact modifier may be a polycarbonate-polysiloxane copolymer comprising a polycarbonate block and a polysiloxane block, wherein the polysiloxane block portion comprises about 0.5 to about 10 wt % of the impact modifier. In another embodiment, the impact modifiers include copolymers of one or more of an acrylic polymer or a methacrylic polymer mainly comprising an alkyl acrylate or an alkyl methacrylate, a silicone polymer mainly comprising a polysiloxane and an optional diene polymer mainly comprising a conjugated diene such as butadiene or isoprene. A preferred impact modifier of this type is polymethylmethacrylate-polyacrylic-polysiloxane copolymer, which is a core shell impact modifier wherein the shell comprises a polymethylmethacrylate graft polymer and the core is a rubbery phase comprised of a copolymer of silicone and acrylic polymers. A commercially available example of such core shell impact modifiers is Metablen® S-2001 from Mitsubishi Rayon.

Impact modifiers may be used in amounts greater than or equal to about 1, and preferably greater than or equal to about 2 weight percent (wt %). Also preferred, the impact modifier is used in amounts less than or equal to about 20, preferably less than or equal to about 15, and more preferably less than or equal to about 12 wt % of the total composition.

The antistatic composition may also comprise at least one flame retardant, generally a halogenated material, an organic phosphate, or a combination of the two. For antistatic compositions containing polyphenylene ether or a polycarbonate resin, the organic phosphate classes of materials are generally preferred. The organic phosphate is preferably an aromatic phosphate compound of the formula (V):

(V)

wherein each R is the same or different and is preferably an alkyl, a cycloalkyl, an aryl, an alkyl substituted aryl, a halogen substituted aryl, an aryl substituted alkyl, a halogen, or a combination of at least one of the foregoing phosphate compounds provided at least one R is aryl.

Examples of suitable phosphate compounds include phenyl bis(dodecyl) phosphate, phenyl bis(neopentyl) phosphate, phenyl bis(3,5,5'-trimethylhexyl phosphate), ethyl diphenyl phosphate, 2-ethylhexyl bis(p-tolyl) phosphate, bis(2-ethylhexyl) p-tolyl phosphate, tritolyl phosphate, bis(2-ethylhexyl) phenyl phosphate, tri(nonylphenyl) phosphate, bis(dodecyl) p-tolyl phosphate, tricresyl phosphate, triphenyl phosphate, dibutylphenyl phosphate, 2-chloroethyl diphenyl phosphate, p-tolyl bis(2,5,5'-trimethylhexyl) phosphate, 2-ethylhexyl diphenyl phosphate, and the like. The preferred phosphates are those in which each R is aryl. A preferred phosphate compound is triphenyl phosphate, which may be unsubstituted or substituted, for example, isopropylated triphenyl phosphate.

Alternatively, the organic phosphate can be a di- or polyfunctional compound or polymer having the formula (VI), (VII), or (VIII) below:

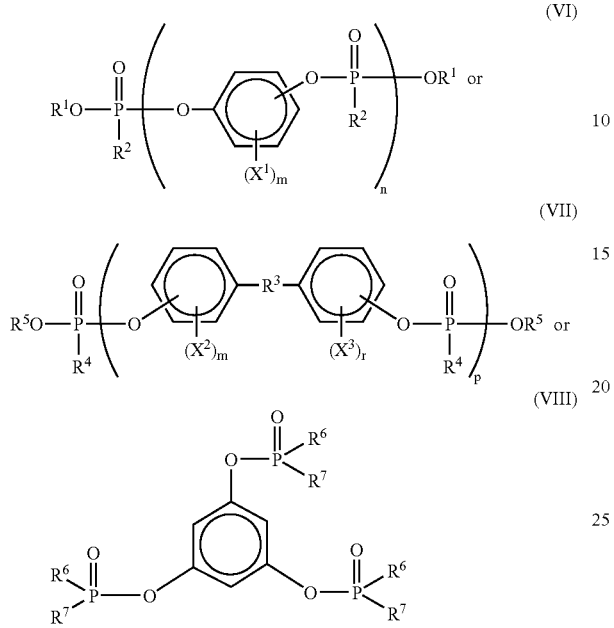

including mixtures thereof, in which $R^1$, $R^3$ and $R^5$ are independently hydrocarbon; $R^2$, $R^4$, $R^6$ and $R^7$ are independently hydrocarbon or hydrocarbonoxy; $X^1$, $X^2$ and $X^3$ are halogen; m and r are 0 or integers from 1 to 4, and n and p are integers from 1 to 30.

Examples of di- and polyfunctional phosphate compounds include the bis (diphenyl phosphates) of resorcinol, hydroquinone and bisphenol-A, respectively, or their polymeric counterparts. Methods for the preparation of the aforementioned di- and polyfunctional phosphates are described in British Patent No. 2,043,083. Another group of useful flame-retardants include certain cyclic phosphates, for example, diphenyl pentaerythritol diphosphate, as a flame retardant resin for polyphenylene ether resins, as is described by Axelrod in U.S. Pat. No. 4,254,775.

Also suitable as flame-retardant additives are the phosphoramides of the formula (IX):

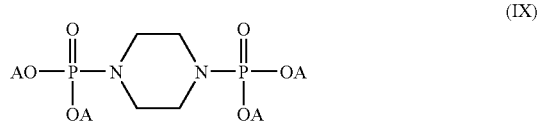

wherein each A is a 2,6-dimethylphenyl moiety or a 2,4,6-trimethylphenyl moiety. These phosphoramides are piperazine-type phosphoramides. These additives have been described in Talley, J. Chem. Eng. Data, 33, 221–222 (1988).

The flame retardant composition may contain a single phosphate compound or a mixture of two or more different types of phosphate compounds. Compositions containing essentially a single phosphate compound are preferred. Preferred phosphate flame-retardants include those based upon resorcinol such as, for example, resorcinol bis(diphenyl phosphate), as well as those based upon bisphenols such as, for example, bisphenol A bis(diphenyl phosphate). Also preferred are the aforementioned piperazine-type phosphoramides. Phosphates containing substituted phenyl groups are also preferred. In an exemplary embodiment, the organophosphate is butylated triphenyl phosphate ester. The most preferred phosphate compounds are resorcinol bis (diphenyl phosphate) (hereinafter RDP), bisphenol A bis (diphenyl phosphate) (hereinafter BPADP) and N,N'-bis[di-(2,6-xylyl)phosphoryl]-piperazine (hereinafter XPP), and mixtures thereof, with BPADP most preferred.

Halogenated materials are also a useful class of flame-retardants. These materials are preferably aromatic halogen compounds and resins of the formula (X):

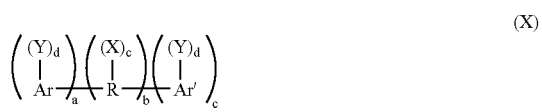

wherein R is an alkylene, alkylidene or a cycloaliphatic linkage, e.g., methylene, ethylene, propylene, isopropylene, isopropylidene, butylene, isobutylene, amylene, cyclohexylene, cyclopentylidene, and the like; a linkage selected from the group consisting of either oxygen ether; carbonyl; amine; a sulfur containing linkage, e.g., sulfide, sulfoxide, sulfone; a phosphorus containing linkage; R can also consist of two or more alkylene or alkylidene linkages connected by such groups as aromatic, amino, ether, carbonyl, sulfide, sulfoxide, sulfone or a phosphorus containing linkage. Ar and Ar' are mono- or polycarbocyclic aromatic groups such as phenylene, biphenylene, terphenylene, naphthylene, and the like. Ar and Ar' may be the same or different. Y is a substituent selected from the group consisting of organic, inorganic or organometallic radicals including but not limited to a halogen, ether groups of the general formula OE, wherein E is a monovalent hydrocarbon radical similar to X, monovalent hydrocarbon groups of the type represented by R or other substituents, e.g., nitro, cyano, and the like, substituents being essentially inert provided there be at least one and preferably two halogen atoms per aryl nucleus. X is a monovalent hydrocarbon group such as an alkyl, e.g., methyl, ethyl, propyl, isopropyl, butyl, decyl, and the like; an aryl group, e.g., phenyl, naphthyl, biphenyl, xylyl, tolyl, and the like; an aralkyl group e.g., benzyl, ethylphenyl, and the like, a cycloaliphatic groups, e.g., cyclopentyl, cyclohexyl, and the like, and a monovalent hydrocarbon groups containing inert substituents therein. It is understood that where more than one X is used, they may be alike or different. The letter d represents a whole number ranging from 1 to a maximum equivalent to the number of replaceable hydrogens substituted on the aromatic rings comprising Ar or Ar'. The letter e represents a whole number ranging from 0 to a maximum controlled by the number of replaceable hydrogens on R. The letters a, b, and c represent whole numbers including 0. When b is not 0, neither a nor c may be 0. Otherwise either a or c, but not both, may be 0. Where b is 0, a direct carbon-carbon bond joins the aromatic groups. The hydroxyl and Y substituents on the aromatic groups, Ar and Ar' can be varied in the ortho, meta or para positions on the aromatic rings and the groups can be in a variety of possible geometric relationship with respect to one another.

Suitable halogenated flame retardant materials include 2,2-bis-(3,5-dichlorophenyl)-propane, bis-(2-chlorophenyl)- methane, bis(2,6-dibromophenyl)-methane, 1,1-bis-(4-iodophenyl)-ethane, 1,2-bis-(2,6-dichlorophenyl)-ethane, 1,1-bis-(2-chloro-4-iodophenyl)ethane, 1,1-bis-(2-chloro-4-methylphenyl)-ethane, 1,1-bis-(3,5-dichlorophenyl)-ethane, 2,2-bis-(3-phenyl-4-bromophenyl)-ethane, 2,6-bis-(4,6-dichloronaphthyl)-propane, 2,2-bis-(2,6-dichlorophenyl)-pentane, 2,2-bis-(3,5-dichromophenyl)-hexane, bis-(4-chlorophenyl)-phenyl-methane, bis-(3,5-dichlorophenyl)-cyclohexylmethane, bis-(3-nitro-4-bromophenyl)-methane, bis-(4-hydroxy-2,6-dichloro-3-methoxyphenyl)-methane, 2,2-bis-(3,5-dichloro-4-hydroxyphenyl)-propane and 2,2 bis-(3-bromo-4-hydroxyphenyl)-propane. The preparation of these halogenated flame-retardants may be by condensation of two moles of a phenol with a single mole of a ketone or aldehyde. In place of the divalent aliphatic group in the above examples may be substituted oxygen, sulfur, sulfoxy, and the like.

Other suitable halogenated flame-retardants include 1,3-dichlorobenzene, 1,4-dibrombenzene, 1,3-dichloro-4-hydroxybenzene and biphenyls such as 2,2'-dichlorobiphenyl, polybrominated 1,4-diphenoxybenzene, 2,4'-dibromobiphenyl, and 2,4'-dichlorobiphenyl as well as decabromo diphenyl oxide, and the like. Also useful are oligomeric and polymeric halogenated aromatic compounds, such as, for example, a copolycarbonate of bisphenol A and tetrabromobisphenol A and a carbonate precursor, e.g., phosgene. Metal synergists, e.g., antimony oxide, may also be used with the flame retardant.

The incorporation of flame-retardants also affords methods to increase the heat distortion temperature (HDT) of the flame retardant antistatic compositions so that the composition has a flame rating of at least V-2, preferably a flame rating of at least V-1, and more preferably a flame rating of V-0 as measured in accordance with a UL-94 protocol. While the particular amount of flame retardant used in the compositions will vary depending on the molecular weight of the organic phosphate, the amount of the flammable resin present in the composition is greater than or equal to about 9 wt % of the total composition. Also preferred, is to have the flame retardant present in an amount less than or equal to about 30, preferably less than or equal to about 25, and more preferably less than of equal to about 20 wt % of the total composition.

One method of preparing the composition includes such steps as dry blending followed by melt processing, the latter operation frequently being performed under continuous conditions such as extrusion. In another exemplary method, the components of the composition, e.g., the polycarbonate resin, impact modifier, antistatic agent and flame retardant, are fed directly into the throat of a twin screw extruder and extruded at a temperature greater than the melting point of the polycarbonate resin. It is also possible for the various components of the composition to be fed into the extruder sequentially. Additionally, some of the components such as the antioxidant and the antistatic agent may be fed into the extruder in a masterbatch form. The strand emerging from the extruder is quenched in a water bath, pelletized and subjected into additional processing such as injection molding, blow molding, vacuum forming, and the like.

This disclosure is further illustrated by the following non-limiting example.

The Table below shows antistatic flame retardant compositions comprising the antistatic agent PELESTAT NC6321 from Sanyo. BPADP obtained from Akzo-Nobel was used as the flame retardant. Lexan PC 145 (obtained from GE Plastics) was used as thermoplastic resin. Polycarbonate-polysiloxane (PC/PDMS) (obtained from GE Plastics) and Metablen® S-2001 (obtained from Mitsubishi Rayon) are used as the impact modifiers.

TSAN (a 1:1 blend of polytetrafluoroethylene and styrene acrylonitrile) was added as an anti-dip agent in an amount of about 0.6 wt %, while hindered phenol was added as the antioxidant in an amount of about 0.3 wt % in all compositions.

The samples represented in the Table were first dry blended in the appropriate quantities in a Henschel high-speed mixer. The dry blends were then extruded in a 30 mm Werner and Pfleiderer Twin Screw extruder having six barrels. The barrel temperature was maintained at 230° C., 240° C., 260° C., 260° C., 260° C., and 260° C., respectively. The die temperature was set at 260° C. and the extruder was run at 300 rpm at 50 lbs/hour. The strand of antistatic flame retardant resin emerging from the extruder was pelletized, dried at approximately 90° C. for two to four hours and subjected to injection molding on an 85 ton Van Dorn molding machine to obtain the test samples.

Samples were tested for flexural strength and flexural modulus as per ASTM D790, tensile strength and elongation as per ASTM D638, notched Izod as per ASTM D256. Flame retardancy tests were performed as per UL94 V-0-2 protocol. 2 mm or 3 mm×0.5-inch×5-inch bars were burned in the vertical position using a calibrated flame height from a Bunsen burner. The flame was applied for 10 seconds and then removed. The flame out time was recorded. The results were fed into a computer program, which predictively ascertains the probability that a particular composition will attain a V-1 or V-2 rating at a given distance from the flame. The method by which the probability is computed is described in U.S. Pat. No. 6,308,142 to Choate et al. the contents of which are incorporated by reference. A value close to 1 indicates that the composition will have a V-1 rating, while a value close to zero indicates that the composition will fail the flame retardancy test. The distance in these examples is chosen as 2 mm. Heat distortion temperature (HDT) was performed on 0.5"×0.125"×5" bars while being subjected to 264 pounds per square inch (psi) load at a rate of 248° F./hour starting at 86° F. and finishing at 554° F. as per ASTM D648. Surface resistivity was measured as per ASTM D257 by placing 4" diameter×0.125" thick disks into a Keithley model 6517A electrometer equipped with a model 6524 high resistance measurement software.

TABLE

|  | 1* | 2* | 3* | 4 | 5 | 6 | 7 |
|---|---|---|---|---|---|---|---|
| Components |  |  |  |  |  |  |  |
| Pelestat NC 6321 | 5 | 7 | 6 | 9 | 5 | 5 | 7 |
| BPADP | 8 | 8 | 6 | 12 | 10 | 12 | 11 |
| PC/PDMS | 0 | 5 | 5 | 5 | 2.5 | 0 | 2.5 |

TABLE-continued

|  | 1* | 2* | 3* | 4 | 5 | 6 | 7 |
|---|---|---|---|---|---|---|---|
| Metablen ® S-2001 | 0 | 0 | 0 | 0 | 2.5 | 5 | 2.5 |
| Polycarbonate 145 | 86.1 | 79.1 | 82.1 | 73.1 | 79.1 | 77.1 | 76.1 |
| Properties |  |  |  |  |  |  |  |
| Flexural Modulus (psi) | 469700 | 379600 | 374700 | 384000 | 376200 | 449600 | 445900 |
| Flexural Strength (psi) | 17130 | 14620 | 14770 | 14340 | 14250 | 15500 | 15740 |
| Tensile Strength (psi) | 9652 | 9194 | 8622 | 9126 | 9103 | 8829 | 8891 |
| Tensile Elongation (%) | 139.97 | 60.77 | 130 | 64.31 | 143.92 | 168.36 | 117.81 |
| N-Izod (ft-lb/inch) | 1.24 | 13.1 | 14.37 | 6 | 14.4 | 15.2 | 14.4 |
| p(FTP) V-1 @ 2 mm | 1.00 | 0.61 | 0.64 | 1.00 | 1.00 | 0.99 | 0.95 |
| Heat Distortion Temperature (° F.) | 206.2 | 205.4 | 213.3 | 186.4 | 197.4 | 186 | 189.8 |
| Surface Resistivity (ohm/sq) | $2.33 \times 10^{13}$ | $7.7 \times 10^{12}$ | $1 \times 10^{13}$ | $2.3 \times 10^{12}$ | $3.6 \times 10^{13}$ | $3.7 \times 10^{13}$ | $6.5 \times 10^{12}$ |

*Comparative examples.

Samples 1, 2, and 3 shown in Table 1 were used as comparative examples, while samples 4, 5, 6, and 7 are representative of the antistatic, flame retardant compositions having high impact. In composition 1, no impact modifier was used and therefore the impact properties as measured by notched Izod were low at 1.24 ft-lbs/inch while the use of BPADP as a flame retardant is effective as can be seen from the V-1 results at 2 mm of 1.0. The surface resistivity of 2.33×10 ohm/sq is attributable to the addition of 5 wt % antistatic agent.

Composition 2 contains 5 wt % of the PC/PDMS impact modifier and hence shows a tremendous increase in impact strength from composition 1. The V-1 value however, drops to 0.61 showing reduced flame retardancy upon addition of the impact modifier, despite the use of the same amount of the flame retardant BPADP. Composition 3 contains a similar amount of impact modifier as composition 2, but contains less flame retardant and antistatic agent. This causes a poor V-1 value as well as an increase in surface resistivity.

Composition 4 demonstrates that by increasing the antistatic agent and the flame retardant content, the sample has improved antistatic properties and better flame retardant properties than composition 2. Samples 4 and 5 have the same amount of antistatic agent as composition 1 but an increased amount of flame retardant, having 10 and 12 wt % respectively. This results in a combination of improved flame retardant as well as high impact properties. Similarly, while sample 6 has the same amount of antistatic agent and impact modifier as sample 2, an increased amount of the flame retardant renders this composition excellent in its flame retardant properties in addition to the impact and surface resistivity properties.

The antistatic, impact resistant, flame retardant compositions can be advantageously used for a number of applications in the area of electronics, automobile components, packaging, and the like, where it is desirable to have notched Izod impact properties greater than or equal to about 1 ft-lb/inch, preferably greater than or equal to about 2 ft-lb/inch. The compositions will preferably have surface resistivities of less than or equal to about $10^{14}$ ohm/square while having a flammability rating of greater than V-2.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. An antistatic composition comprising:
a polycarbonate resin;
an impact modifier comprising a polycarbonate-polysiloxane copolymer;
an antistatic agent; and
a flame retardant comprising phosphorus, wherein the flame retardant is present in an amount greater than or equal to about 9 wt % of the total composition.

2. The composition of claim 1, wherein the polycarbonate resin comprises about 10 to about 90 wt % of the total composition.

3. The composition of claim 1, wherein the antistatic agent comprises a polyetheresteramide, a polyetherester, a polyetheramide, or a combination comprising at least one of the foregoing antistatic agents.

4. The composition of claim 1, wherein the antistatic agent comprises about 0.01 to about 25 wt % of the total composition.

5. The composition of claim 1, wherein the impact modifier comprises about 1 to about 20 wt % of the total composition, and wherein the impact modifier further comprises a polymethylmethacrylate-polyacrylic-polysiloxane copolymer.

6. The composition of claim 1, wherein the impact modifier comprises about 2 to about 12 wt % of the total composition.

7. The composition of claim 1, wherein the flame retardant is an aromatic phosphate compound of the formula (V):

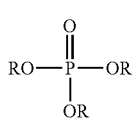

(V)

wherein each R may be the same or different and is alkyl, cycloalkyl, aryl, alkyl substituted aryl, halogen substituted aryl, aryl substituted alkyl, halogen, or a combination comprising at least one of the foregoing substituents.

8. The composition of claim 1, wherein the flame retardant is an -aromatic-phosphate, and phenyl bis(dodecyl)

phosphate, phenyl bis(neopentyl) phosphate, phenyl bis(3,5,5-trimethylhexyl) phosphate, ethyl diphenyl phosphate, 2-ethylhexyl di(p-tolyl) phosphate, bis(2-ethylhexyl) p-tolyl phosphate, tritolyl phosphate, bis(2-ethylhexyl) phenyl phosphate, tri(nonylphenyl) phosphate, bis(dodecyl) p-tolyl phosphate, tricresyl phosphate, triphenyl phosphate, dibutyl phenyl phosphate, 2-chloroethyl diphenyl phosphate, p-tolyl bis(2,5,5'-trimethylhexyl) phosphate, 2-ethylhexyl diphenyl phosphate, or a combination comprising at least one of the foregoing aromatic phosphates.

9. The composition of claim 1, wherein the flame retardant is a di- or polyfunctional compound having the formula (VI), (VII), or (VIII):

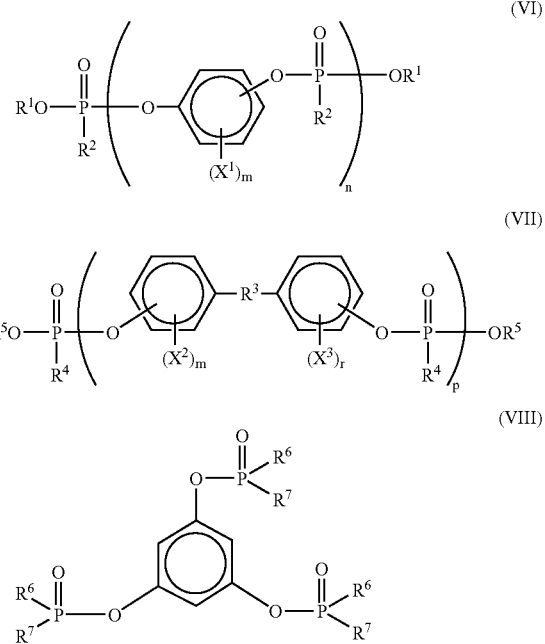

wherein $R^1$, $R^3$ and $R^5$ are, independently, hydrocarbon; $R^2$, $R^4$, $R^6$ and $R^7$ are, independently, hydrocarbon or hydrocarbonoxy; $X^1$, $X^2$ and $X^3$ are halogen; m and r are 0 or integers from 1 to 4, and n and p are from 1 to 30.

10. The composition of claim 1, wherein the flame retardant is a phosphoramide of the formula (IX):

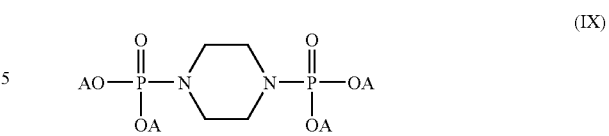

wherein each A is a 2,6-dimethylphenyl moiety or a 2,4,6-trimethylphenyl moiety.

11. The composition of claim 1, wherein the flame retardant is selected from resorcinol bis(diphenyl phosphate), bisphenol A bis(diphenyl phosphate) N,N'-bis[di-(2,6-xylyl)phosphoryl]-piperazine, or a combination comprising at least one of the foregoing flame retardants.

12. The composition of claim 1, wherein the flame retardant is bisphenol A bis(diphenyl phosphate).

13. The composition of claim 1, wherein the flame retardant comprises about 10 to about 30 wt % of the total composition.

14. The composition of claim 1, wherein the composition has flammability rating of V-0 and a notched Izod greater than 2 ft-lbs/inch and a surface resistivity less than $10^{14}$ ohm/sq.

15. The composition of claim 1, wherein the composition has a flammability rating of V-1, a notched Izod greater than 2 ft-lbs/inch and a surface resistivity of less than $10^{14}$ ohms/sq.

16. The composition of claim 1, wherein the composition has a flammability rating of V-2, a notched Izod greater than 2 ft-lbs/inch and a surface resistivity of less than $10^{14}$ ohms/sq.

17. An article comprising the composition of claim 1.

18. An antistatic flame retardant composition comprising, based on the total weight of the composition:
   about 10 to about 90 wt % of a polycarbonate resin;
   about 1 to about 20 wt % of an impact modifier comprising a polycarbonate-polysiloxane copolymer;
   about 0.01 to about 25 wt % of an antistatic agent; and
   greater than or equal to about 9 wt % of a flame retardant comprising bisphenol A bis(diphenyl phosphate).

19. A method of manufacturing an antistatic composition, comprising:
   extruding a polycarbonate resin, an impact modifier comprising a polycarbonate-polysiloxane copolymer, a polymeric antistatic agent, and a flame retardant comprising phosphorus, wherein the flame retardant is present in an amount greater than or equal to about 9 wt % of the total composition.

* * * * *